(12) United States Patent
Oxenknecht et al.

(10) Patent No.: US 8,104,573 B2
(45) Date of Patent: Jan. 31, 2012

(54) HEAT SHIELD AND AN INSULATING ISOLATOR FOR THE HEAT SHIELD

(75) Inventors: Ernest Oxenknecht, Naperville, IL (US); Franz Schweiggart, Pfaffenhofen (DE); Oliver Schimmele, Pfaffenhofen (DE); Giacomo Giaimi, Ulm (DE)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 12/888,663

(22) Filed: Sep. 23, 2010

(65) Prior Publication Data
US 2011/0067952 A1   Mar. 24, 2011

Related U.S. Application Data

(60) Provisional application No. 61/244,900, filed on Sep. 23, 2009.

(51) Int. Cl.
  *E04B 1/82* (2006.01)
(52) U.S. Cl. ............... 181/284; 181/200; 181/210
(58) Field of Classification Search .......... 181/207, 181/211, 200, 284; 264/140.11; 29/450, 29/509, 512, 523; 248/560, 615, 677
See application file for complete search history.

(56) References Cited

U.S. PATENT DOCUMENTS

| | | | |
|---|---|---|---|
| 3,037,734 A | 6/1962 | Coyle | |
| 3,107,905 A * | 10/1963 | Lucas | 267/161 |
| 3,123,957 A | 3/1964 | Helwig | |
| 3,840,420 A | 10/1974 | Sarcia | |
| 4,365,986 A | 12/1982 | Nayak | |
| 4,830,164 A | 5/1989 | Hays | |
| 5,211,013 A | 5/1993 | Bonde | |
| 5,313,928 A | 5/1994 | Rodgers | |
| 5,844,177 A | 12/1998 | Pirchl | |
| 6,059,503 A | 5/2000 | Johnson | |
| 6,177,173 B1 * | 1/2001 | Nelson | 428/137 |
| 6,328,513 B1 | 12/2001 | Niwa | |
| 6,550,868 B2 * | 4/2003 | Kobayashi et al. | 301/6.91 |
| 6,561,312 B2 | 5/2003 | Stanienda | |
| 6,665,991 B2 * | 12/2003 | Hasan | 52/410 |
| 6,681,890 B1 | 1/2004 | Chen | |
| 7,146,807 B1 | 12/2006 | Mondelci | |
| 7,273,128 B2 | 9/2007 | Niwa | |
| 7,284,748 B2 * | 10/2007 | Mishima | 267/140.11 |
| 7,296,654 B1 * | 11/2007 | Berman | 181/207 |
| 2003/0197109 A1 * | 10/2003 | Tsai | 248/560 |

(Continued)

FOREIGN PATENT DOCUMENTS

DE   197 16 733   10/1998

(Continued)

*Primary Examiner* — Forrest M Phillips
(74) *Attorney, Agent, or Firm* — Marshall & Melhorn LLC

(57) ABSTRACT

An insulating isolator for a heat shield has a unitary first land, a bead portion, a second land and a half bead. The first land defines a fastener aperture. In one case, a plurality of circumferentially spaced apart petals is formed in the isolator. The petals may be separated by gaps. In another case, a set of circumferentially spaced apart apertures are formed in the isolator.

The heat shield may have at least two disk apertures. Two metallic disks are located in the area of at least one of the two disk apertures. The metallic disks are connected to each other, have aligned fastener openings that are smaller than the disk apertures and they are smaller than the metallic sheet. One of the metallic disks may have a bead.

27 Claims, 7 Drawing Sheets

U.S. PATENT DOCUMENTS

| | | | |
|---|---|---|---|
| 2005/0028963 A1 | 2/2005 | Niwa | |
| 2006/0219434 A1 | 10/2006 | Beutter | |
| 2006/0219860 A1* | 10/2006 | Greenwood | 248/560 |
| 2007/0280780 A1 | 12/2007 | Bruehl | |
| 2008/0041501 A1 | 2/2008 | Platek | |
| 2009/0000861 A1 | 1/2009 | Hikami | |
| 2010/0047011 A1* | 2/2010 | Eberle et al. | 403/280 |
| 2010/0301529 A1* | 12/2010 | Garety et al. | 267/140.13 |

FOREIGN PATENT DOCUMENTS

| | | |
|---|---|---|
| DE | 10 2007 030 983 | 1/2009 |
| EP | 1281876 | 2/2003 |
| EP | 1788215 | 5/2007 |
| EP | 1 894 763 | 3/2008 |
| GB | 2246183 | 1/1992 |
| JP | 2004-251407 | 9/1994 |
| JP | 10-54256 | 2/1998 |
| JP | H11-50842 | 2/1999 |
| JP | 2002-235800 | 8/2002 |
| JP | 2004-169733 | 6/2004 |
| JP | 2004-116442 | 4/2005 |
| JP | 2007082371 * | 3/2007 |
| JP | 2007-113479 | 5/2007 |
| WO | 2006-128676 | 12/2006 |
| WO | 2007-085213 | 8/2007 |
| WO | 2010-102656 | 9/2010 |

* cited by examiner

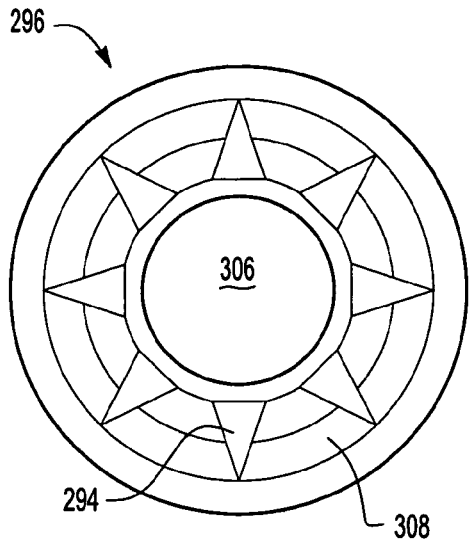
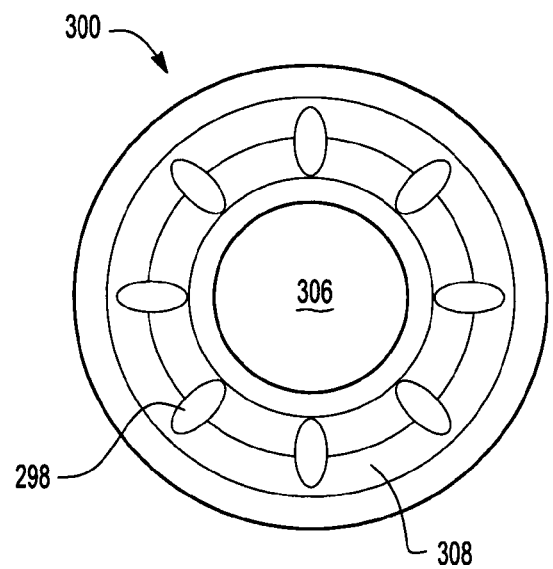
Fig-17    Fig-18
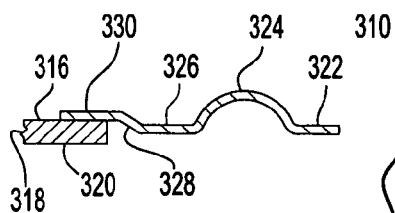
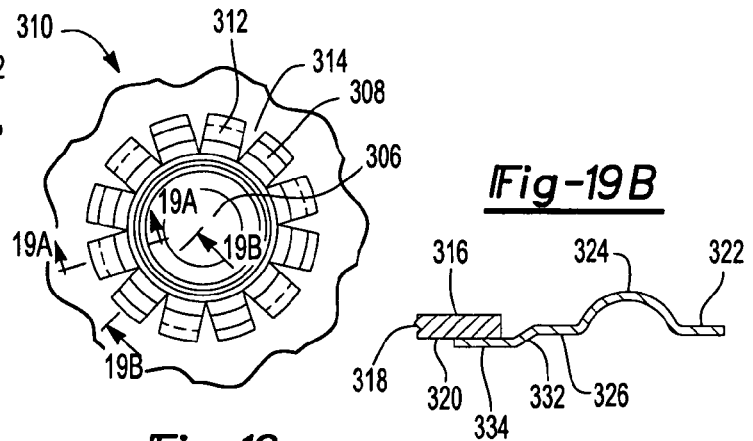
Fig-19A    Fig-19    Fig-19B
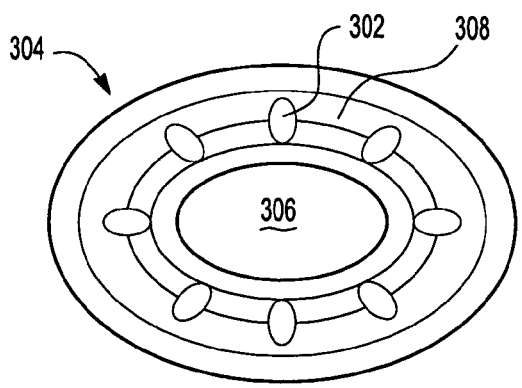
Fig-20

HEAT SHIELD AND AN INSULATING ISOLATOR FOR THE HEAT SHIELD

RELATED APPLICATIONS

This application claims benefit from U.S. patent application Ser. No. 61/244,900 filed on Sep. 23, 2009, which is incorporated by reference in its entirety herein.

FIELD OF THE INVENTION

The present invention relates to a heat shield and an insulating isolator for the heat shield, such as for an internal combustion engine.

BACKGROUND OF THE INVENTION

In today's modern vehicles, the exhaust manifolds of internal combustion engines can reach under-the-hood temperatures in the neighborhood of 1600 degrees Fahrenheit. Such high temperatures can create significant risks of damage to components, such as electronic components, nested under the hood. Thus, protection is warranted, and has been provided via use of heat shields designed to cover up, or partially block, and hence to insulate, exhaust manifolds and other heat generating components.

Manifold heat shields conventionally mount to the exhaust manifold of an internal combustion engine with a stand-off bracket or mounting boss. The heat shields are secured to the manifold by at least one bolt that extends through the heat shield and into the mounting boss or the stand-off bracket. Typically, the heat shield is connected to the manifold in more than one location.

It can be appreciated that where the heat shield is connected to the exhaust manifold, the temperature in the heat shield can be at its greatest due to heat conducting from the manifold directly into the heat shield. Thus, the connection points between the heat shield and the exhaust manifold must be able to withstand severe temperature conditions.

In most cases, the heat shield and the manifold are not constructed of the same material. Thus, the manifold expands and contracts differently than the heat shield in response to heat or the lack thereof. The different relative movement of the manifold and heat shield can make alignment of the two difficult. It would therefore be preferable to provide a solution in a heat shield that accommodates these differences.

Typically, the entire heat shield is constructed of a material designed to withstand the conditions at the connection point with the manifold. However, the rest of the heat shield may not be exposed to such severe conditions. Thus, it would be advantageous to develop a mounting configuration that effectively insulated the mounting areas of the heat shield from the rest of the shield so that the majority of the shield could be constructed of a lower cost or lower melting point, low mass material.

In addition, it would be advantageous to develop a mounting configuration that simultaneously functioned as an isolator for mechanical vibration from the engine. It would be further advantageous to be able to tune an isolator for a particular application to minimize transmission of any vibrations.

SUMMARY OF THE INVENTION

In one embodiment, an insulating isolator has a first land, a bead portion, a second land and a half bead. The first land defines a fastener aperture.

In one case, a plurality of circumferentially spaced apart petals is formed in the isolator. The petals may be separated by gaps. In another case, a set of circumferentially spaced apart apertures are formed in the isolator.

In another embodiment, a heat shield for thermal and acoustical insulation of an object has at least one metallic sheet. At least two disk apertures pass through the at least one metallic sheet. Two metallic disks are located in the area of at least one of the two disk apertures. The metallic disks are connected to each other, have aligned fastener openings that are smaller than the disk apertures and they are smaller than the metallic sheet. At least one of the metallic disks has a bead about at least one fastener opening. The bead is located within the disk aperture. The bead has a height corresponding to the metallic sheet adjacent the at least two disk apertures.

BRIEF DESCRIPTION OF THE DRAWINGS

The above, as well as other advantages of the present invention, will become readily apparent to those skilled in the art from the following detailed description when considered in the light of the accompanying drawings in which:

FIG. 12-1 is a partial section view of another embodiment of the invention;

FIG. 17 is a top view of another embodiment of an insulating isolator according to the invention;

FIG. 18 is a top view of another embodiment of an insulating isolator according to the invention;

FIG. 19 is a top view of another embodiment of an insulating isolator according to the invention; and FIG. 20 is a top view of another embodiment of an insulating isolator according to the invention.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless expressly stated otherwise.

Figure 1:
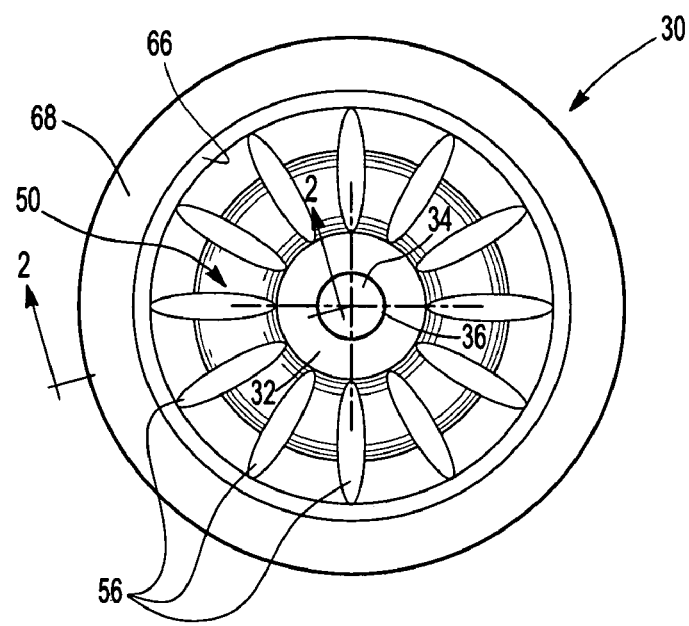
FIG. 1 is a schematic top view of one embodiment of the present invention.
Figure 2:
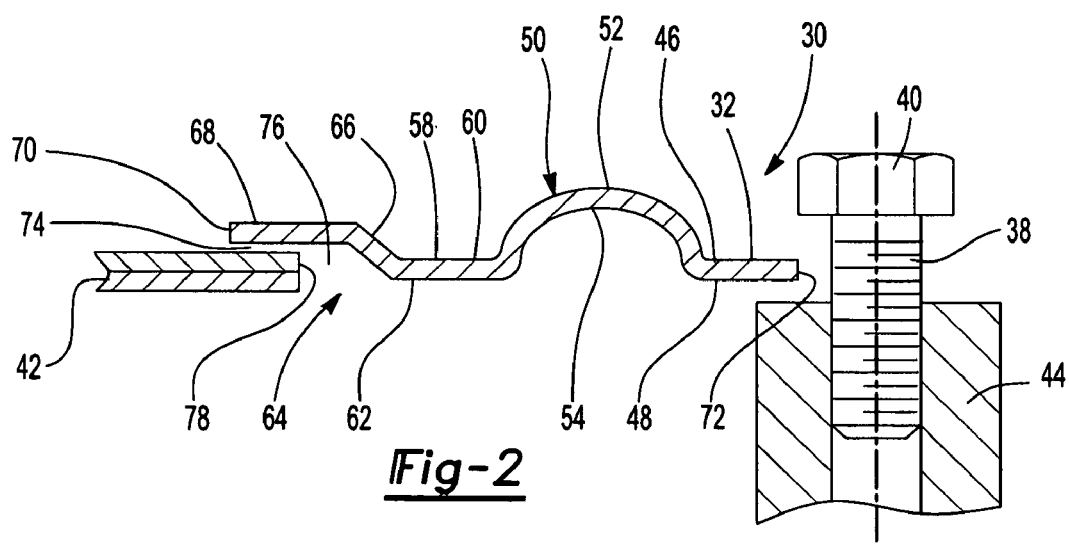
FIG. 2 is a section view through line A-A of FIG. 1.

Referring now to FIGS. 1 and 2, one embodiment of an insulating isolator 30 of the present invention is depicted. In this embodiment, the isolator 30 has a first land 32 that continuously surrounds a fastener aperture 34. The first land 32 comprises an inner edge 36 that forms the perimeter of the fastener aperture 34. In this embodiment, the perimeter is circular, however, other shapes are also permissible. For example, the perimeter may define any polygon, including a square, a rectangle, a star, and/or any curvilinear design and designs with only curves, such as ovals.

The following discussion of the embodiment depicted in FIGS. 1 and 2 uses the term "land", and the other embodiments discussed below also use the term "land." According to the present invention, any land described or depicted herein may be entirely planar, partially planar and partially curved or entirely curved. Partially curved or entirely curved include, but are not limited to, convex and concave shapes.

The first land 32 extends radially outward from the inner edge 36 into the isolator 30 for a predetermined distance. The first land 32 extends in the radial direction at least as much as to provide a surface for a fastener 38, such as a bolt, to abut. More specifically, if the fastener 38 is a bolt, it is preferred that the first land 32 have an outward radial dimension so that a head 40 of the fastener 38 can urge the isolator 30, and thus a heat shield 42, into contact with a stand-off bracket or mounting boss 44.

Preferably, the fastener 38 contacts the first land 32 and maybe the inner edge 36 of the isolator 30, but nothing else of the isolator 30. The first land 32 may also be in contact with the stand-off bracket/boss 44, but no other part of the isolator 30 contacts the bracket/boss 44.

The first land 32 preferably has an upper surface 46 and a lower surface 48. The upper and lower surfaces 46, 48 are both preferably planar and parallel to one another. With the upper and lower surfaces 46, 48 being planar and parallel to one another, the first land 32 has a substantially constant thickness.

An embossed bead portion 50 is located radially outward from the first land 32. Preferably, the embossed bead portion 50 is located entirely about the first land 32 (with the exception of the holes discussed below) and the bead portion 50 is unitary and one-piece with the first land 32.

In the depicted embodiment, the bead portion 50 comprises a hemispherical shape. The bead portion 50 has an upper surface 52 and a lower surface 54 wherein the surfaces 52, 54 are substantially identical to one another except that the lower surface is offset from the upper surface 52 by the substantially constant thickness of the isolator 30.

The hemispherical upper and lower surfaces 52, 54 result in a convex shape in the isolator 30 at the bead portion 50. While a convex shape is depicted, it can be appreciated that other shapes for the bead portion 50 may be used with the present invention, including concave, trapezoidal, square, and rectangular.

The bead portion 50 assists in isolating resonance and vibrations that come from the exhaust manifold bracket/boss 44 through the fastener 38 and into the isolator 30. The shape and/or height of the bead portion 50 may be selected, or tuned, to isolate a particular resonance or vibration for a particular application. For example, bead portions 50 of greater height permit increased motion whereas bead portions 50 of relatively low height limit motion, which is particularly helpful in tight operating environments. The foregoing equally applies to other beads, both full and half, discussed below.

A plurality of apertures 56 may be located in the isolator 30 radially outboard from the fastener aperture 34. In the depicted embodiment, all of the apertures 56 begin at approximately the same radial distance from the fastener aperture 34 and all of the apertures 56 terminate at approximately the same radial distance from the fastener aperture 34. In the depicted embodiment, the apertures 56 are equally spaced apart from one another.

While a particular number of apertures are depicted, a greater number or fewer number may be present. It has been found that by increasing the number of apertures 56 the isolator 30 becomes more flexible and springy, while reducing the number of apertures 56 increases the stiffness of the isolator 30.

By adjusting the number and kind of apertures 56 in the isolator 30, the stiffness of the isolator 30, and therefore its ability to transmit vibration, may be modified.

Furthermore, the apertures 56 may be of any shape or orientation including but not limited to the oval design depicted in FIG. 1. By way of example only, the holes may be the shape of any polygon or any curved shape. It has been found that by utilizing shapes that remove a greater degree of material that the isolator 30 becomes more flexible and springy, while utilizing shapes that leave more material behind in the isolator 30 results in the isolator becoming stiffer. The foregoing equally applies to apertures in other isolators, discussed below.

The apertures 56 may also comprise louvers or fins (not shown). Louvers or fins provide increased surface area for an isolator. The increased area functions to transfer more heat by radiation and convection away from the isolator.

A second land 58 is located radially outward from the bead portion 50. Preferably, the second land 58 entirely surrounds the bead portion 50. The second land 58 is preferably integrally formed and unitary with the bead portion 50.

The second land 58 preferably has an upper surface 60 and a lower surface 62. The upper and lower surfaces 60, 62 are both preferably planar and parallel to one another. With the upper and lower surfaces 60, 62 being planar and parallel to one another, the second land 58 has a substantially constant thickness.

It is also preferred that the upper and lower surfaces 60, 62 of the second land 58 are parallel and in the same vertical plane as the upper and lower surfaces 46, 48 of the first land 32.

A half bead portion 64 is located radially outward from the second land 58. The half bead portion 64 is preferably unitary and integrally formed with the second land 58. The half bead portion 64 comprises an inclined portion 66 directly connected to the second land 58. The half bead portion 64 extends from the second land 56 at a predetermined angle to a third land 68. The third land 68 may be parallel to, but vertically offset from, the first and second lands 32, 58. The half bead portion 64 can be designed to be springy, thus permitting some axial motion with respect to the heat shield 42.

The half bead portion 64 defines an outermost perimeter 70 of the isolator 30. The perimeter 70 is depicted as a circumference, however, the present invention is not limited to circular perimeters. Instead, the outer perimeter 70 may comprise any shape.

The outermost perimeter 70 is longer than an inner perimeter 72 of the isolator 30. As conductive heat flows from the inner perimeter 72 to the outer perimeter 70, it encounters more and more of the isolator 30. Furthermore, the surface area of the isolator 30 is increasing from the inner perimeter 72 radially outward. This design permits the isolator 30 to effectively radiate and remove heat by convection. As a result, there is a significant temperature drop from the inner perimeter 72 to the outer perimeter 30. The lower temperature at the outer perimeter 70 permits materials with a lower melting point to be used for the heat shield 42 as the risk of them degrading about the isolator 30 is minimized or eliminated. The foregoing equally applies to other isolators depicted and described herein.

It is also within the scope of the present invention that the thickness of any part of the isolator 30 described above may vary with respect to any other part so that the heat flow and resonance of the isolator 30 can be tailored to the specific application.

The heat shield 42 may be located below the third land 68. A first gap 74 may be between the heat shield 42 and the third land 68. A second gap 76 may be located between an inner edge 78 of the heat shield 42 and the inclined portion 66. Alternatively, no gaps may exist.

The heat shield 42 may be secured to the isolator 30 by welding, mechanical fasteners, a friction fit, crimping or the like. In the depicted embodiment, a multi-layer heat shield 42 is depicted, however, the present invention is not limited to just these shields.

Figure 3:
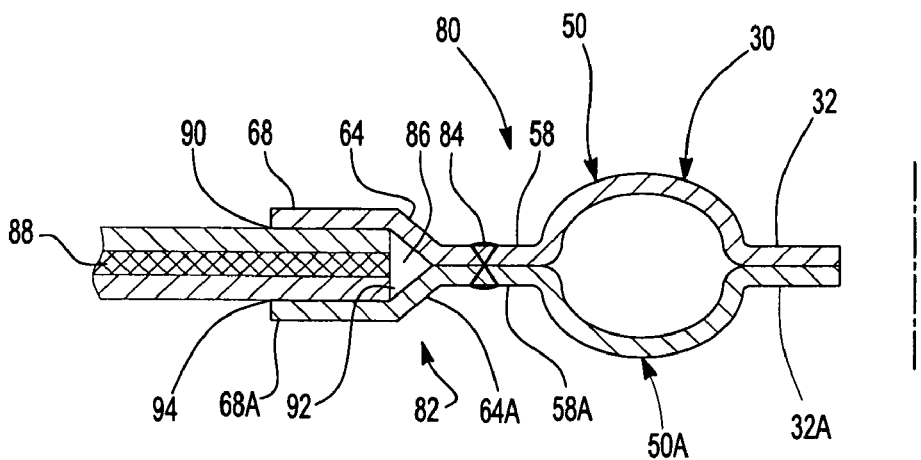
FIG. 3 is a schematic side view of another embodiment of the invention.

Turning now to FIG. 3 another embodiment of an isolator 80 is depicted wherein a second isolator 82 is entirely mirrored beneath the first isolator 30. The first and second isolator 30, 82 may be connected together by one or more spot welds 84, but other structures for connecting the two, including other welding techniques, mechanical fasteners, male female fittings, and the like may be used. The second isolator 82 has all of the features of the first isolator 30. An "A" designation is provided to the same features in the second isolator 82 as in the first isolator 30.

The half bead portions 64, 64A and the lands 68, 68A of the first isolator 30 and the second isolator 82 together form a pocket 86 for receiving a heat shield 88. A first gap 90 may be located between the third land 68 and the heat shield 88, a second gap 92 maybe located between an end 92 of the heat shield 88 and a third gap 94 may be located between the heat shield 42 and the third land 68A. The half bead portions 64, 64A may be constructed of a springy material that permits axial movement of the isolators 30, 32 with respect to the heat shield 88. It is also permissible for no gaps to exist.

The half bead portions 64, 64A clamp the heat shield 88 between them and hold it securely in place. There is little to no movement of the heat shield 88 with respect to half bead portions 64, 64A.

The embodiment of FIG. 3 may provide a high degree of stiffness as both isolators 30, 82 are in contact with one another at their first and second lands 32, 32A, 58, 58A. The present invention also contemplates varying the stiffness through different designs described above and below. Additionally, the thickness of any part of the first isolator 30 and/or the second isolator 82 may be varied with respect to any other part.

Figure 4:
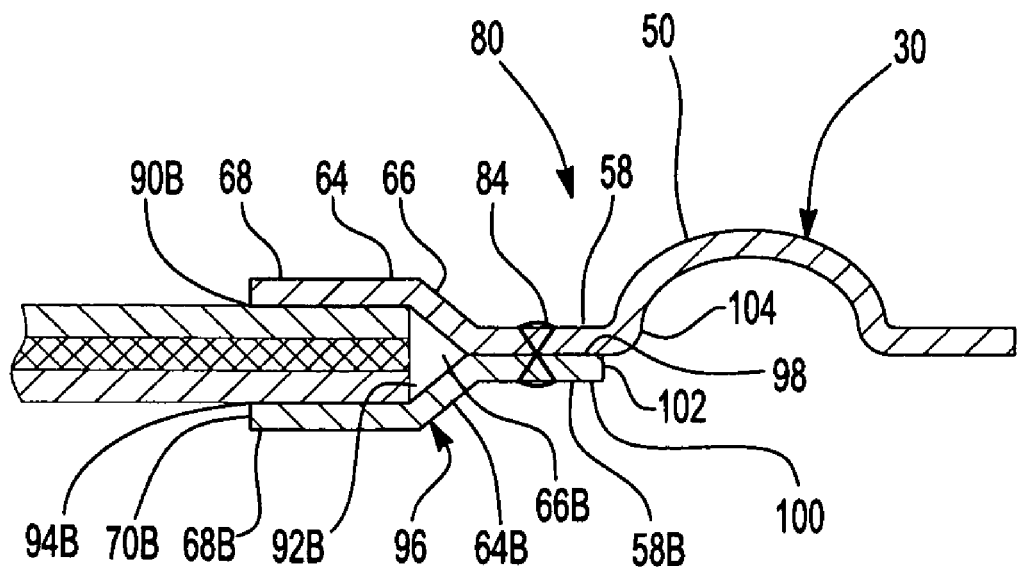
FIG. 4 is a schematic side view of yet another embodiment of the invention.

Turning now to FIG. 4, another embodiment of the present invention is depicted wherein a first isolator 30 is provided that is identical to the isolator 30 described above.

The embodiment of FIG. 4 differs from the previously described embodiments in that it has approximately one-half of an isolator 96 located beneath the first isolator 30. Features of the isolator 96 that are the same as the isolator 30 are designated with a "B".

Preferably, the isolator 96 has a land 58B with an upper and a lower surface 98, 100. The upper and lower surfaces 98, 100 are substantially parallel to one another thus providing for a substantially constant thickness of the land 58B.

The land 58B has an innermost perimeter 102 that is substantially radially aligned with an innermost perimeter 104 of the second land 58 of the isolator 30. The land 58B of the isolator 96 extends radially outward where it contacts a half bead portion 64B.

The half bead portion 64B is preferably unitary with and integrally formed with the land 98. Preferably, the half bead 64B has the same thickness as the land 98.

The half bead 64B comprises an inclined portion 66B directly connected to the land 98. The inclined portion 66B extends from the land 58B at a predetermined angle. The angle at which the inclined portion 66B extends is preferably the same angle as the inclined portion 66 of the isolator 30 described above, however, the inclined portion 66B diverges from the inclined portion 66 of the isolator 30 above.

A land 68B is unitary with and integrally formed with the inclined portion 66B. The land 68B may be parallel to, but vertically offset from, the land 58B.

The land 68B defines an outermost perimeter 70B of the isolator. The perimeter 70B may define a circumference, however, the present invention is not limited to circular perimeters. Instead, the outer perimeter 70B may comprise any shape.

Gaps 90B, 92B, 94B, as disclosed above, may or may not be present. Further, the two isolators 30, 80 may be secured together as disclosed above. Further, the heat shield is secured with respect to the half bead portions 64, 64B as disclosed above.

Figure 5:
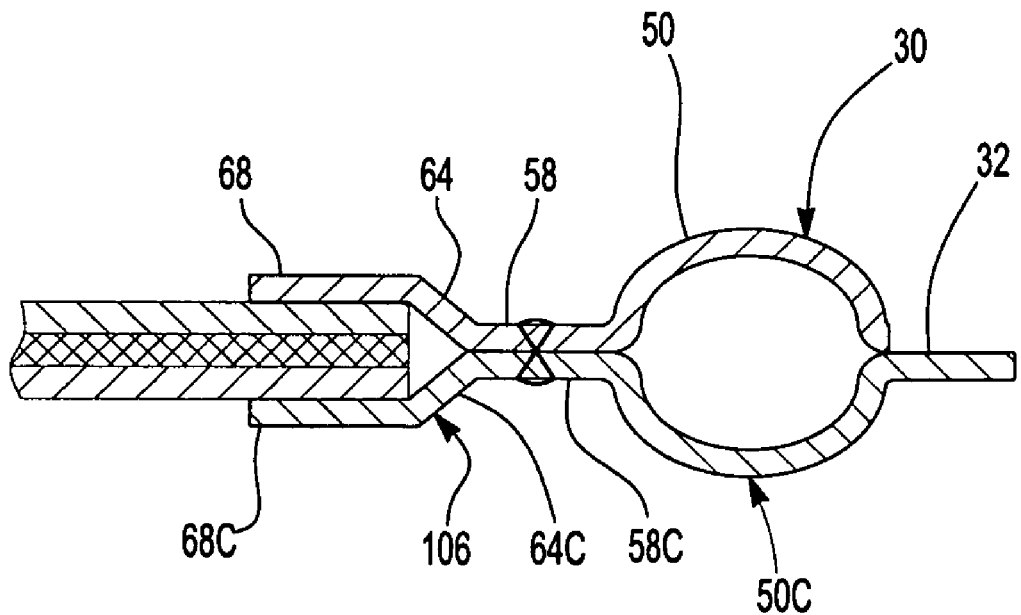
FIG. 5 is a schematic side view of yet another embodiment of the invention.

Yet another embodiment of the present invention is depicted in FIG. 5. FIG. 5 depicts an isolator 106 that is identical to that depicted in FIG. 3 except that it does not have a land below land 32. A "C" designation is provided to the same features in isolator 106 as in the first isolator 30.

The isolator 106 may be a mirror image of isolator 30 above it, except as noted. Alternatively, the isolator 106 may comprise a different shape or design to permit the isolator to be tuned for heat dissipation and/or vibration.

Figure 6:
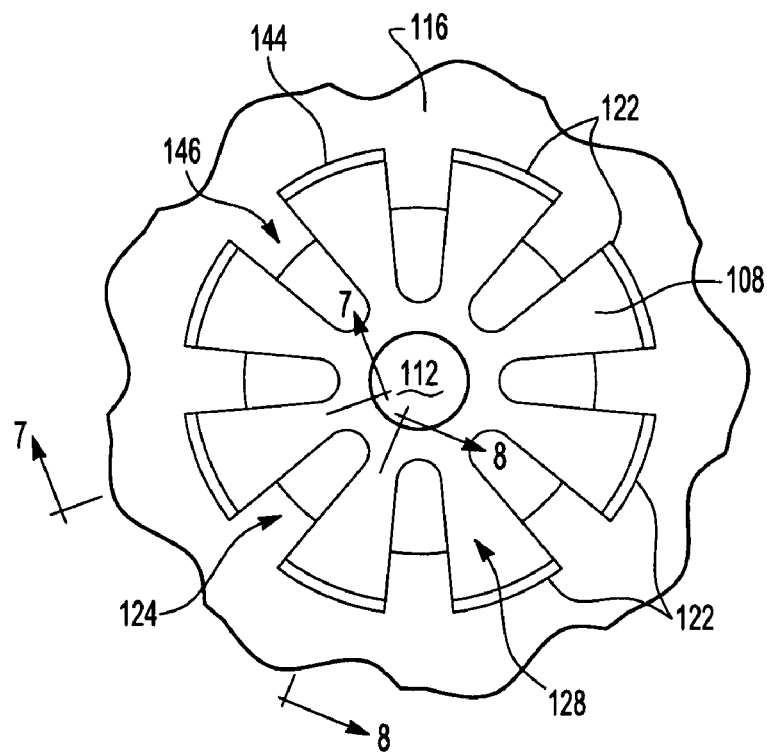
FIG. 6 is a schematic top view of another embodiment of the invention.
Figure 7:
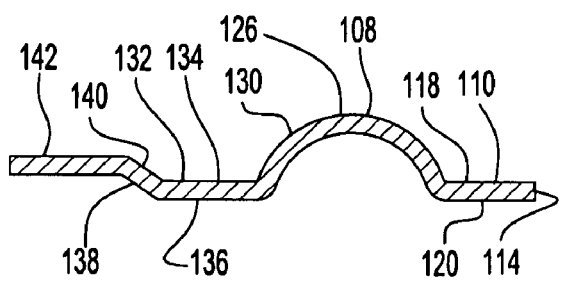
FIG. 7 is a section view through line A-A of FIG. 6.
Figure 8:
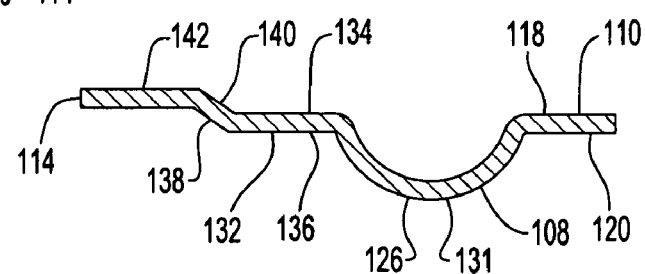
FIG. 8 is a section view through line B-B of FIG. 6.

FIGS. 6-8 depict another embodiment of the present invention. In this embodiment, the isolator 108 has a first land 110 that entirely surrounds a fastener aperture 112. The first land 110 comprises an inner edge 114 that forms the perimeter of the fastener aperture 112. In this embodiment, the perimeter is circular, however, other shapes are also permissible. For example, the perimeter may define any polygon, including a square, a rectangle, a star, any curvilinear design and designs with curves, such as ovals.

The first land 110 extends radially outward from the inner edge 114 into the isolator 108 for a predetermined distance. The first land 110 extends in the radial direction at least as much as to provide a surface for a fastener, (not shown, but as provided above) such as a bolt, to abut. More specifically, if the fastener is a bolt, it is preferred that the first land 110 have an outward radial dimension so that the head of the bolt can urge the isolator 108, and thus a heat shield 116, into contact with a stand-off bracket or mounting boss (not shown, but as provided above).

Preferably, only the fastener contacts the first land 110 and the inner edge 114 of the isolator 108 and no other part of the isolator 108 is in contact with the fastener. The first land 110 may be in contact with the exhaust manifold (not shown, but as provided above).

The first land 110 preferably has an upper surface 118 and a lower surface 120. The upper and lower surfaces 118, 120 are both preferably planar and parallel to one another. With the upper and lower surfaces 118, 120 being planar and parallel to one another, the first land 110 has a substantially constant thickness.

A plurality of petal-like structures 122 is integrally formed with and unitary with the first land 110. The petal-like structures 122 extend substantially radially from the first land 110. A U-shaped or V-shaped gap 124 extends between the petal-like structures 122 from the first land 110 to the ends of the petal-like structures 122.

While a particular number of petal-like structures 122 and gaps 124 are depicted, a greater number or fewer number of gaps 124, and thus structures 122, may be present. It has been found that by increasing the number of gaps 124 and/or making them larger causes the isolator 108 to become more flexible and springy, while reducing the number of gaps 124 or their size increases the stiffness of the isolator 108.

Furthermore, the length of the petal-like structures 122 can be tailored to fit a particular application. For example, petals that are relatively long permit increased motion of the isolator whereas petals that are relatively short limit isolator motion.

Furthermore, the gaps 124 may be of any shape or orientation other than the U-shaped or V-shaped design depicted in the Figure. It has been found that by utilizing gap shapes that remove a greater degree of material, that the isolator 108 becomes more flexible and springy, while utilizing gap shapes that leave more material behind in the isolator 108 results in the isolator 108 becoming stiffer.

The petal-like structures 122 are comprised of an embossed bead 126 on an inboard portion 128 of the structures 122, although the bead 126 may be located anywhere in the petal-like structure 122. The bead 126 extends through each of the structures 122 at a substantially constant radial distance from the first land 110. However, it is permissible for the bead 126 to only extend through selected petal-like structures 122.

In the depicted embodiment, the embossed bead 126 may comprise an upper hemispherical shape 130 and a lower hemispherical shape 131. The direction of the hemispherical shapes 130, 131 may vary or alternate, or they may all be in the same direction. It has been found that alternating the hemispheres on the petals 122 with one another functions to center the isolator 108 after it incurs motion.

While a hemispherical shape is depicted, it can be appreciated that other shapes may be used with the present invention, including trapezoidal, square, and rectangular.

The bead portion 126 assists in isolating resonance and vibrations that come from the bracket/boss (not shown) through the fastener and into the isolator 108. The shape of the bead portion 126 may be selected to isolate a particular resonance or vibration for a particular application.

Radially outward from the bead portion 126, a second land 132 is provided in each petal-like structure 122. Preferably, the second land 132 is at substantially the same radial distance from the bead portion 126. The second land 132 is preferably integrally formed and unitary with the bead portion 126.

The second land 132 preferably has an upper surface 134 and a lower surface 136. The upper and lower surfaces 134, 136 are both preferably planar and parallel to one another. With the upper and lower surfaces 134, 136 being planar and parallel to one another, the second land 132 has a substantially constant thickness.

It is also preferred that the upper and lower surfaces 134, 136 of the second land 132 are parallel and in the same vertical plane as the upper and lower surfaces 118, 120 of the first land 110.

A half bead portion 138 is located radially outward from the second land 132. The half bead portion 138 is preferably unitary and integrally formed with the second land 132. The half bead portion 138 comprises an inclined portion 140 directly connected to the second land 132. The half bead portion 138 extends from the second land 132 at a predetermined angle to a third land 142. The third land 142 may be parallel to, but vertically offset from, the first and second lands 110, 132.

The half bead portion 138 may be located anywhere radially outward from the second land 132. Thus, it may be located near the outer edges 144 of the petals 122, as shown in FIG. 6, or it may be located more inwardly from the outer edges 144.

The perimeters of the petal-like structures 122 are all connected together in one outer perimeter 146. The outer perimeter 146 is depicted as substantially curvilinear, however, the present invention is not limited to curvilinear perimeters.

The petal-like structures 122 increase the distance the perimeter 146 covers, as compared to a circular perimeter. The extra distance provides additional surface area for transferring heat from the isolator 108.

It is also within the scope of the present invention for some or all of the outer edges 144 of the petals 122 to be turned up and/or down. A turned outer edge 144 has been found to offer increased heat rejection as they function as heat radiators to further dissipate heat coming from the hotter inner portions of the isolator 108.

The turned petals 122 may be all turned up, all turned down, or some may be turned up and others down. For example, individual petals 122 may alternate with one another whether they are turned up or down. In this embodiment, space is provided to accommodate the heat shield 116.

Figure 9:
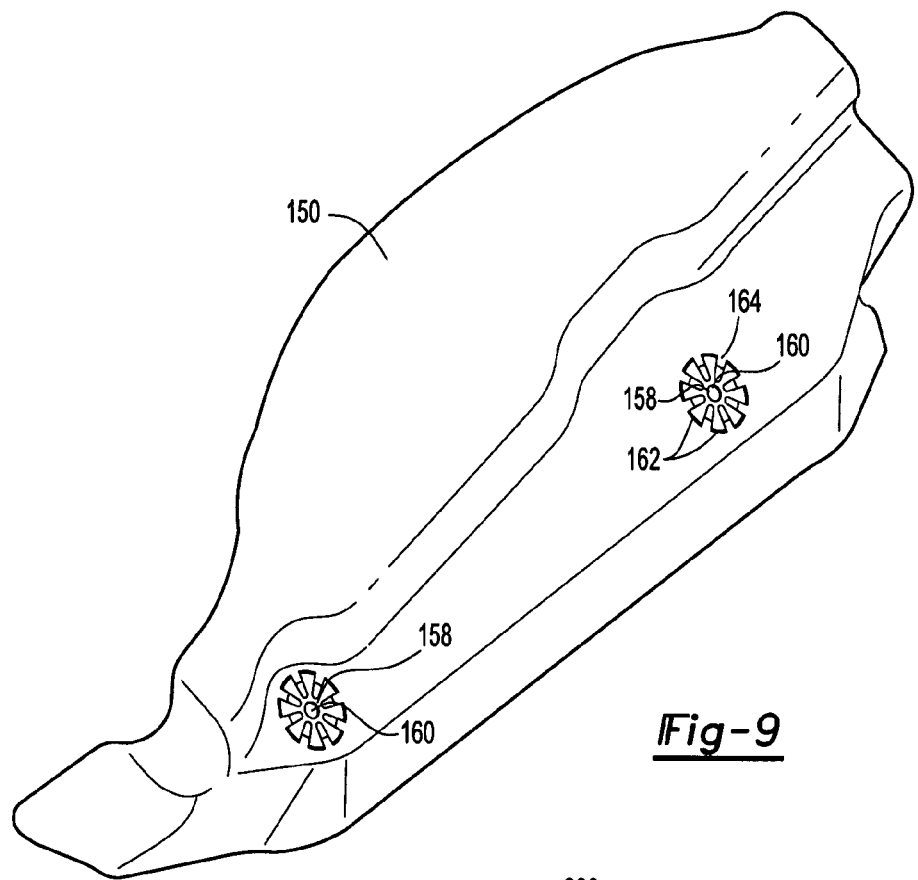
FIG. 9 is a perspective view of one embodiment of a heat shield.

Turning now to FIG. 9, one embodiment of a heat shield 150 is depicted. While a heat shield 150 with one shape and size is depicted, the present invention is not limited to the depicted embodiment. Regardless of the embodiment, the shield 150 may be for both thermal and acoustical insulation of an object, such as an internal combustion engine (not shown).

The heat shield 150 may be comprised of one or more layers. In the embodiment depicted in FIG. 10, the heat shield 150 is comprised of an upper metal sheet 152, a lower metal sheet 154 and an intermediate layer 156 located between the two metal sheets 152, 154. Additional upper layers, lower layers and intermediate layers are permissible. Fewer layers are also permissible.

The intermediate layer 156, or layers, may be nonmetallic. Nonmetallic materials that may be used, without limitation, comprise high-temperature resisting fibre materials, compressed mica particles and/or compressed vermiculite particles.

At least two disk apertures 158 extend entirely through the shield 150. The disk apertures 158 are located in the shield 150 where mechanical apertures need to extend through the shield 150 to support the shield 150 on mounting bosses or brackets (see, for example, FIG. 11) of an exhaust manifold (see, for example, FIG. 11). FIG. 9 depicts the disk apertures 158 in one location in the heat shield 150 of the invention. However, the disk apertures 158 may be located anywhere in the shield 150.

Preferably, at least one metallic disk is located at least in the area of at least one of the disk apertures 158. More particularly, at least one metallic disk is located at least partially within each of the disk apertures 158. In a preferred embodiment of the invention, two metallic disks are located in each disk aperture 158 so that a majority of the disks are in the apertures but that part of the disks engages with the heat shield about the disk apertures. For example, outer portions of the disks may overlap with the heat shield adjacent the apertures.

The metallic disks may be comprised of a variety of different embodiments. As shown in FIG. 9, at least one of the disks has a petal-like shape. Preferably, both of the disks have a fastener aperture 160 surrounded by a section of the disk. A petal-like structure 162 extends radially outward from the section. The petals may be equally spaced apart from one another. Gaps 164 may exist between each of the petals.

Figure 10:
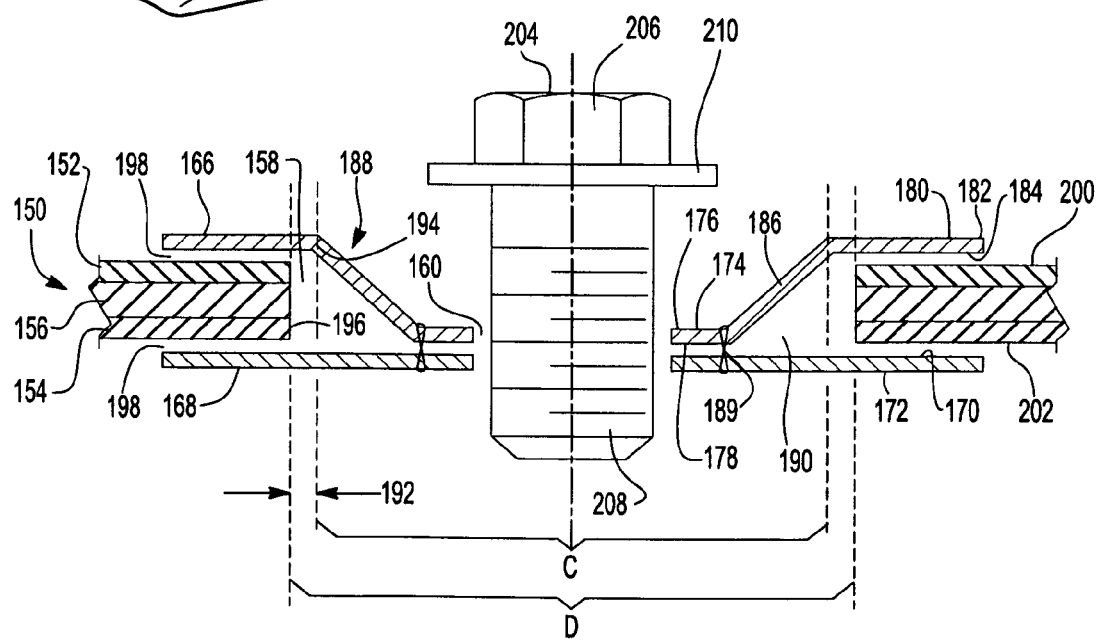
FIG. 10 is a partial section view along line A-A of one embodiment of the invention.

In the embodiment depicted in FIG. 10, two metallic disks are shown located in a disk aperture 158, as described above. The two metallic disks comprise an upper disk 166 and a lower disk 168. The lower disk 168 has a planar upper surface 170 and a planar lower surface 172. The surfaces 170, 172 are substantially parallel with one another thus providing the lower disk with a substantially constant thickness. The fastener aperture 160 extends entirely through the lower disk 168.

The disks 166, 168 may be constructed of any metal material. In one embodiment, the disks 166, 168 are comprised of a spring-elastic metal at least where the disks 166,168 are located adjacent the heat shield 150. The disks 166, 168 may also be made of relatively stiff material. The spring-elastic metal and the relative stiff material may be such as stainless steel or carbon steel.

The thickness of the metal that comprises each of the disks 166, 168 may be constant or it may vary. Preferably, the thickness is constant and is approximately 0.1 to 0.4 mm. More preferably, the thickness is approximately 0.15 to 0.3 mm.

The fastener aperture 160 of the upper disk 166 extends entirely therethrough and it is preferred that the upper disk fastener aperture 160 and the lower disk fastener aperture 160 be aligned with one another. It is also preferred that each disk 166, 168 only be provided with a single fastener opening 160. This is true for each embodiment disclosed herein.

The upper disk 166 has a first land 174 extending radially outward from the fastener aperture 160. The first land 174 has a planar upper surface 176 and a planar lower surface 178 that define a substantially constant thickness between them.

The upper disk 166 also comprises a second land 180. The second land 180 has a planar upper surface 182 and a planar lower surface 184 that define a substantially constant thickness between them.

The second land 180 terminates at the same radial distance from the fastener aperture 160 as the lower disk 168. In the depicted embodiment, the termini of the second land 180 and the lower disk 168 form round edges.

An inclined portion 186 connects the first land 174 and the second land 180. Preferably, the first land 174, inclined portion 186 and the second land 180 are unitary. The lands 174, 180 and the inclined portion 186 form a bead 188. The bead 188 is circumferential about the fastener aperture 160.

The bead 188 provides a vertical offset to the second land 180 that corresponds to the height of the heat shield 150, at least adjacent the disk aperture 158.

The upper disk 188 and the lower disk 168 may be secured together. They may be secured together by form-locking, an adhesive, and/or welding, such as laser or point welding. Other methods and structures for securing the disks 166, 168 together are permissible.

In the depicted embodiment, the disks 166, 168 are secured together in the area of the first land 174 of the upper disk 166 and the upper surface 170 of the lower disk 168 via a weld 189. The present invention encompasses connecting the two disks 166, 168 in other areas as well.

Preferably, the disks 166, 168 are connected together in an area of the disks 166, 168 where the joined thickness in that area is less than the thickness of the heat shield 150 at least in the area around the fastener aperture 160. It is also preferred that the disks 166, 168 are joined within the disk apertures.

The disks 166, 168 are smaller in area than the heat shield 150. However, the disks 166, 168 are larger than the disk apertures 158. More particularly, the surface area of one of the disks 166, 168, including any openings, is at least 1.2 times an area of one of the disk apertures 158. Preferably, the disk surface area is at least 1.4 times the area of a disk aperture 158.

A heat shield pocket 190 is provided between the upper disk 166 and the lower disk 168. The heat shield 150 is located in the pocket 190. Preferably, the heat shield 150 is located in the pocket 190 such that there is an offset 192 between the radially outermost edge 194 of the inclined portion 186 and an innermost edge 196 of the heat shield 150. The offset 192 results in the inclined portion 186 being entirely located within the disk aperture 158 of the heat shield 150. Item "C" in FIG. 10 depicts the area of the fastener aperture 160, the first land 180 and the inclined portion 186 while item "D" depicts the area of the disk aperture 158. It is preferred that the disks 166, 168 be permitted to move radially with respect to the heat shield 150.

In FIG. 10, as well as the other figures, a gap 198 is depicted between the disks 166, 168 and the heat shield 150. The gap 198 is exaggerated in order to depict it in the figures (which are not to scale) as in reality, at least one disk 166, 168 and in some cases both disks 166, 168, are in direct contact with the heat shield 150. By way of example only, there may be no gap between the an upper surface 200 of the heat shield 150 and the lower surface 178 of the second land 174, and no gap 198 between a lower surface 202 of the heat shield 150 and the upper surface 170 of the lower disk 168. Axial movement of the isolators, if any, with respect to the heat shield may be achieved as described above.

As also shown in FIG. 10, a mechanical fastener 204 is located through the fastener aperture 160. The fastener 204 may be such as a bolt comprised of a head 206, a body 208 and a support area 210. The support area 210 is designed to directly contact the upper surface 176 of the first land 174. The body 208 of the fastener 204 extends through the fastener aperture 160 where it engages with the exhaust manifold boss (not shown in FIG. 10, but the same as FIG. 11).

Figure 11:
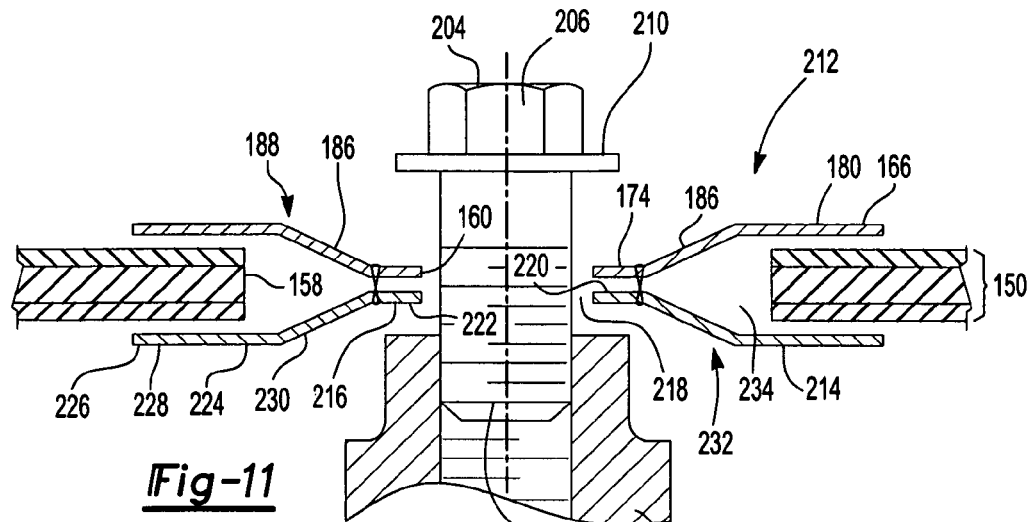
FIG. 11 is a partial section view of yet another embodiment of the invention.

FIG. 11 depicts yet another embodiment of an insulating isolator 212 comprising the features disclosed above but with a different lower disk 214. The lower disk 214 may be attached to the upper disk 166 as disclosed above.

The lower disk 214 has a first land 216 extending radially outward from a fastener aperture 218. The first land 216 has a planar upper surface 220 and a planar lower surface 220 that define a substantially constant thickness between them.

The lower disk 214 also comprises a second land 224. The second land 224 has a planar upper surface 226 and a planar lower surface 228 that define a substantially constant thickness between them.

The second land 224 terminates at the same radial distance from the fastener aperture 218 as the upper disk 166. In the depicted embodiment, the termini of the second land 224 and the upper disk 166 form round edges.

An inclined portion 230 connects the first land 216 and the second land 224. The inclined portion 230 extends away from the inclined portion 186 of the upper disk 166. Preferably, the first land 216, inclined portion 230 and the second land 224 are unitary. The lands 216, 224 and the inclined portion 230 form a bead 232. The bead 232 is circumferential about the fastener aperture 218.

The bead 232 provides a vertical offset to the second land 224 with respect to the first land 216. The vertical offset provided by the lower disk 214 and the vertical offset from the upper disk 166 correspond to the thickness of the heat shield 150. The upper and lower disks 166, 214 form a heat shield pocket 234.

It can be appreciated from the above that the two disks 166, 214 are substantially the same as one another. The present invention also contemplates that the two disks 166, 214 may have some variation between them. Preferably, however, the two disks 166, 214 are substantially congruent with one another, as are the disks that follow.

Figure 12:
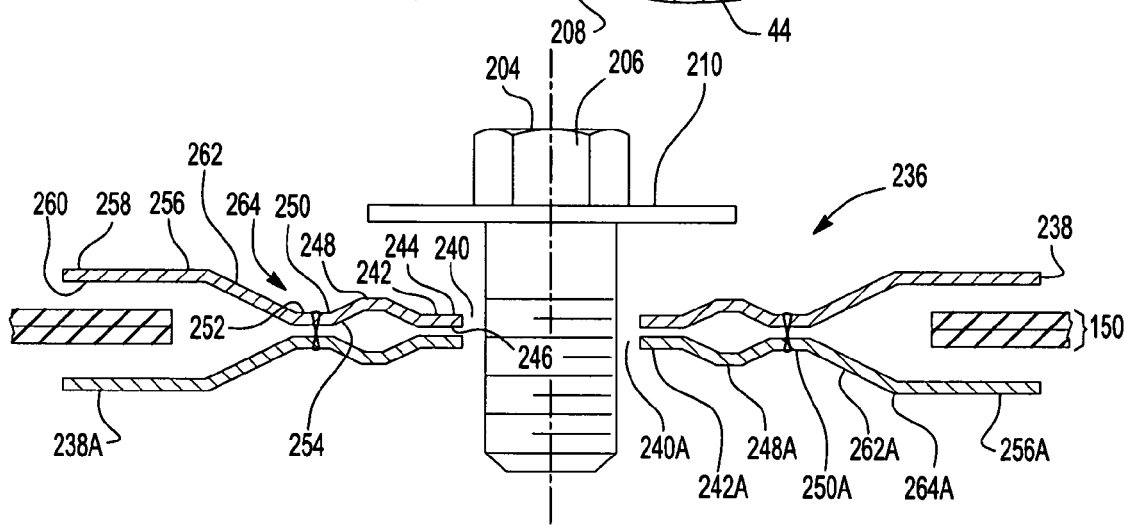
FIG. 12 is a partial section view of another embodiment of the invention.
Figures 1, 12:
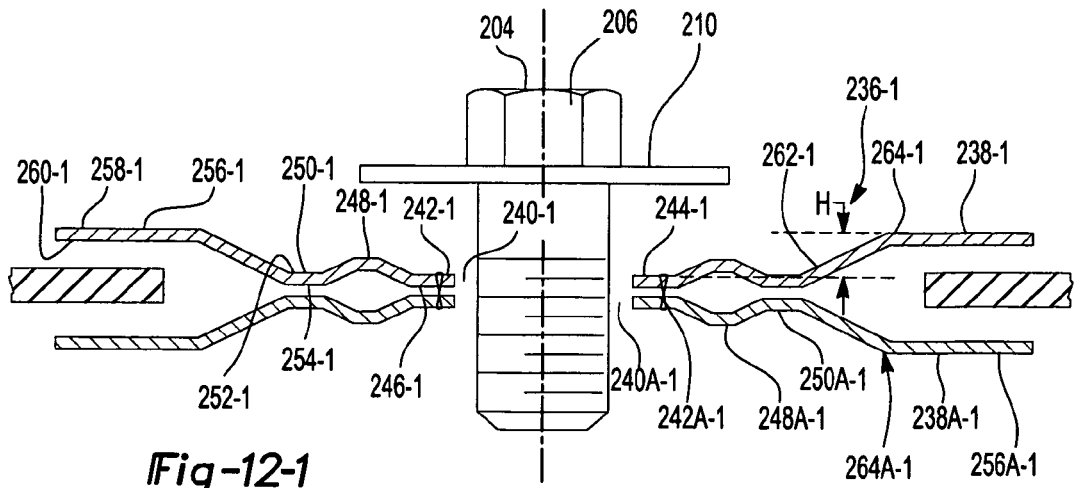

FIG. 12 depicts yet another embodiment of an insulating isolator 236. An upper disk 238 has a fastener aperture 240 extending entirely therethrough. A first land 242 extends radially outward from the fastener aperture 240. The first land 242 has a planar upper surface 244 and a planar lower surface 246 that define a substantially constant thickness between them. A full bead 248 is unitary with the first land 242 directly radially outboard of the first land 242.

A second land 250 extends directly radially outward from the full bead 248. The second land 250 has a planar upper surface 252 and a planar lower surface 254 that define a substantially constant thickness between them.

The upper disk 238 also comprises a third land 256. The third land 256 has a planar upper surface 258 and a planar lower surface 260 that define a substantially constant thickness between them.

An inclined portion 262 connects the second land 250 and the third land 256. Preferably, the second land 250, the inclined portion 262 and the third land 256 are unitary. The lands 250, 256 and the inclined portion 262 form a bead 264. The bead 264 is circumferential about the fastener aperture 240.

The first land 242 and the second land 250 are planar with one another. However, the third land 256 is vertically offset from the first and second lands 242, 250. All the lands are parallel with one another.

In this embodiment, the lower disk 238A is a mirror image of the upper disk 238. The features discussed above for the upper disk 238 are depicted in the figure with the same reference numbers with an "A" designation for the lower disk 238A.

The disks 238, 238A may be secured together via any means disclosed above. As depicted in the figure, the disks 238, 238A are connected with a weld at the lands 250, 250A.

The support area 210 of the fastener 204 extends radially further than the fastener support areas that have preceded or which follow. The full bead 248, 248A may be contacted by the support area 210 to increase the clamping force between the fastener 204, the insulator 236 and the bracket/boss (not shown). In this embodiment too, the beads 264, 264A hold the heat shield 150 as described above.

Figure 13:
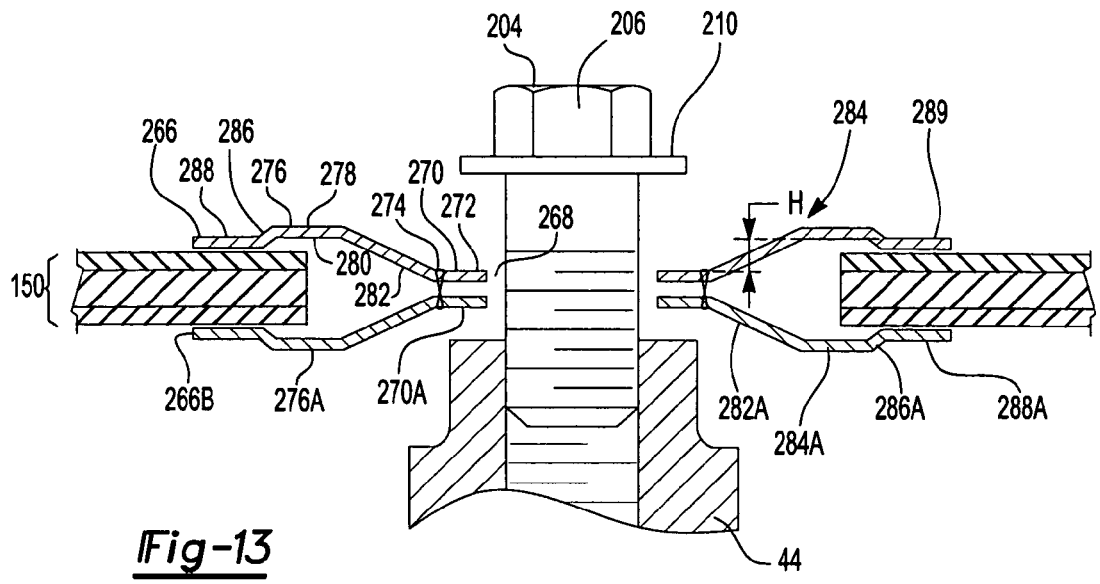
FIG. 13 is a partial section view of another embodiment of the invention.

FIG. 13 depicts yet another embodiment of the present invention. The upper disk 266 has a fastener aperture 268 extending entirely therethrough. The upper disk 266 has a first land 270 extending radially outward from the fastener aperture 268. The first land 270 has a planar upper surface 272 and a planar lower surface 274 that define a substantially constant thickness between them.

The upper disk 266 also comprises a second land 276. The second land 276 has a planar upper surface 278 and a planar lower surface 280 that define a substantially constant thickness between them.

A first inclined portion 282 connects the first land 270 and the second land 276. Preferably, the first land 270, first inclined portion 282 and the second land 276 are unitary. The lands 270, 276 and the first inclined portion 282 form a bead 284. The bead 284 is circumferential about the fastener aperture 268.

A second inclined portion 286 is located directly radially outward from the second land 276. The second inclined portion 286 is inclined opposite the first inclined portion 286.

A third land 288 is located directly radially outward from the second inclined portion 286. The third land 288 is substantially parallel to the first land 270 and second land 276 but it is located in a vertical plane between the first land 270 and the second land 276.

The second land 276 and the third land 288 are vertically offset from the first land 270, with the second land 276 having the greatest vertical offset between the two.

A vertical offset H is present between the upper surface 272 of the first land 280 and an upper surface 289 of the third land. The vertical offset H is a result of both inclined portions 282, 286, which are effectively two beads.

In this embodiment, the lower disk 266A is a mirror image of the upper disk 266. The features discussed above for the first disk 266 are depicted in the figure with the same reference numbers with an "A" designation.

FIG. 12-1 depicts a variation on the embodiment of FIG. 12. Reference numbers used in FIG. 12 will be used for similar features in FIGS. 12-1 but with a "dash one" designation.

The disks are preferably joined at the first lands 242-1, 242A-1 via a weld. A vertical offset H is provided between the upper surface 244-1 of the first land 242-1 and/or the upper surface 252-1 of the second land 250-1 and the upper surface 258-1 of the third land 256-1. In this embodiment, vertical offset H is measured only from the outermost bead 264-1 or 264A-1.

Figure 14:
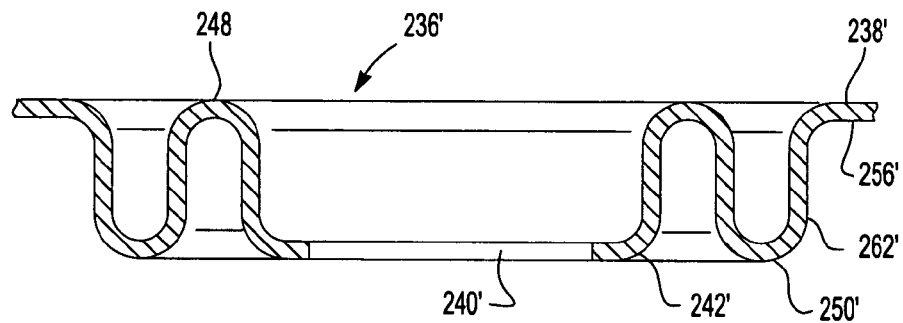
FIG. 14 is a sectional view of one embodiment of an insulating isolator according to the invention.

FIG. 14 depicts another embodiment of an insulating isolator 236' of FIG. 12. FIG. 14 demonstrates that the various lands and inclined portions may be of different lengths and angles than as shown in FIG. 12.

Figure 15:
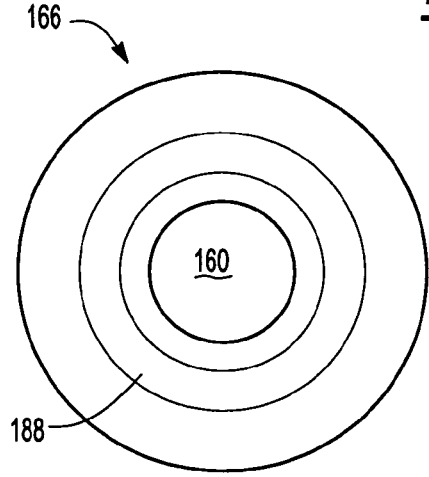
FIG. 15 is a top view of one embodiment of an insulating isolator according to the invention.
Figure 16:
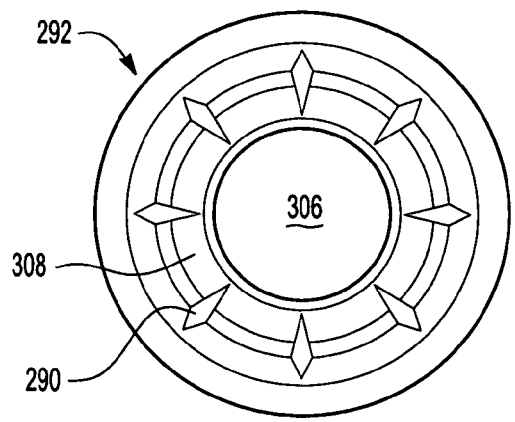
FIG. 16 is a top view of another embodiment of an insulating isolator according to the invention.

FIGS. 15-18 and 20 depict alternative embodiments for either the upper or the lower disk of the preceding figures. In FIG. 15, a disk, such as the upper disk 166 from FIG. 10, is depicted. A fastener aperture 160 is provided, but otherwise the disk 166 is solid. In FIG. 16, diamond-like apertures 210 are located in a round disk 292. FIG. 17 depicts triangular apertures 294 in a round disk 296. FIG. 18 depicts oval apertures 298 in a round disk 300. FIG. 20 depicts oval apertures 302 in an oval disk 304. The apertures may also comprise slits or cuts.

The number 306 is used for the fastener aperture in each disk 292, 296, 300, 304 and 310. Additionally, 308 will be used for each bead.

FIG. 19 depicts a disk 310 with a fastener aperture 306. The disk 310 may be for either an upper or lower disk. A plurality of petal-like structures 312 extend radially from the disk 310. The structures 312 depict yet another embodiment within the scope of the present invention. The structures may be square shaped with gaps 314 between them.

As with any other embodiment above utilizing petal-like structures, the individual petals 312 of a single disk 310 may alternate from an upper surface 316 of a heat shield 318 to a lower surface 320 of a heat shield 318 to secure the disk 312 to the heat shield 318.

A first land 322 extends about and encircles the fastener aperture 306. A full bead 324 is unitary with and extends radially from the first land 322. Preferably, the full bead 324 extends in the same axial direction about the land 322. A second land 326 is unitary with and extends radially from the full bead 324. For certain petals 312, a first inclined portion 328, which comprises bead 308, extends in a first direction. A third land 330 is unitary with and extends from the inclined portion 328. For other petals 312, a second inclined portion 332, which also comprises bead 308, extends in a second direction, divergent from the first direction. A fourth land 334 is unitary with and extends from the inclined portion 332.

The inclined portions 328, 332 and the lands 330, 334 accommodate the heat shield 318 therein and the lands 330, 334 secure the heat shield 318.

The number of apertures in a disk is permitted to vary as well as the size and shape of the apertures. Preferably, the apertures in a disk all start at the same radial distance from the fastener aperture and all of the apertures in a disk end at the same radial distance from the fastener aperture. However, it is permissible for these distances to vary between apertures in a disk.

The apertures in disk may be located equidistant from one another, as shown in FIGS. 8-11. However, it is also permissible for the distances between apertures to vary.

Preferably, all of the isolators described herein are constructed of a material capable of withstanding the high temperatures associated with the exhaust manifold environment. A variety of metal materials may be utilized, separately or in combination including, but not limited to stainless steel. It is also within the scope of the present invention for any isolator to be constructed entirely out of ceramic materials or in combination with a metal material.

All of the embodiments described and depicted herein are designed to achieve mechanical vibration isolation of the natural frequency of the isolator and the heat shield compared with the operating frequency of the structure it is attached to, such as an engine exhaust manifold, to minimize vibration transmission of the heat shield. The isolators can be tuned to the specific application via any of the designs described and depicted herein, or via combinations thereof. Furthermore, it should be appreciated that one embodiment of an isolator may be used simultaneously with a different embodiment of the isolator in the same application to achieve a particular result.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. An insulating isolator, comprising:
    a first land having planar and parallel upper and lower surfaces, said land defining an inner perimeter for a fastener aperture;
    a bead portion located radially outward from said first land and unitary therewith;
    a second land located radially outward from said bead portion and unitary therewith, said second land having planar and parallel upper and lower surfaces, said surfaces of said second land being planar with said surfaces of said first land; and
    a half bead located radially outward from said second land, said half bead comprising an inclined portion unitary with said second land and a planar portion.

2. The insulating isolator of claim 1, wherein said first land extends continuously about said inner perimeter and it extends radially outward to said bead portion.

3. The insulating isolator of claim 1, wherein said planar portion of said half bead has parallel upper and lower surfaces wherein said upper surface is vertically offset from said upper surfaces of said first and second lands.

4. The insulating isolator of claim 1, wherein each aperture in a plurality of spaced apertures begin at the same radial distance from said fastener aperture, terminate at the same radial distance from said fastener aperture and are equally spaced from one another.

5. The insulating isolator of claim 1, further comprising a second insulating isolator comprising a lower second land below and directly connected to said second land and a lower half bead below and extending away from said half bead.

6. The insulating isolator of claim 5, further comprising a lower bead portion below and extending away from said bead portion, said lower bead portion unitary with said lower second land.

7. The insulating isolator of claim 6, further comprising a lower first land below and directly connected to said first land, said lower first land unitary with said lower bead portion.

8. The insulating isolator of claim 5, wherein said half bead and said lower half bead form a heat shield pocket.

9. The insulating isolator of claim 1, wherein said bead portion, said second land and said half bead are petal-shaped structures extending from said first land.

10. The insulating isolator of claim 9, wherein said petal-shaped structures define U-shaped gaps between them.

11. The insulating isolator of claim 1, wherein an outer perimeter portion radially outward from, but unitary with said planar portion of said half bead, is angled.

12. A heat shield for thermal and acoustical insulation of an object, comprising:
    at least one metallic sheet;
    at least two disk apertures passing through said at least one metallic sheet;
    two metallic disks at least partially located in at least one of said two disk apertures, said metallic disks being connected to each other and having aligned fastener openings in each that are smaller than said disk apertures, said metallic disks being smaller than said metallic sheet, wherein at least one of said metallic disks has a bead circumferential about said fastener openings, said bead being radially located within said disk apertures, said disks having a height corresponding to said metallic sheet adjacent said at least two disk apertures.

13. The heat shield of claim 12, wherein said metallic disks each have exactly one fastener opening radially inward from said bead.

14. The heat shield of claim 13, wherein at least one of the metallic disks at least in the area of said bead comprises slits or holes.

15. The heat shield of claim 13, wherein said two metallic disks have a rounded shape.

16. The heat shield of claim 13, wherein said at least two metallic disks are substantially congruent.

17. The heat shield of claim 13, wherein the surface area of each of said at least two metallic disks, including openings, is at least 1.4 times an area of one of said fastener openings in said metallic sheet.

18. The heat shield of claim 13, wherein said at least two metallic disks are moveably seated with respect to said metallic sheet.

19. The heat shield of claim 13, wherein said metallic disks are comprised of a spring-elastic metal at least adjacent said metallic sheet.

20. The heat shield of claim 13, wherein both of said metallic disks each have a unitary bead immediately adjacent said metallic sheet, wherein respective slopes of said beads diverge from one another and areas of said metallic disks encircled by said beads rest on one another other and the areas distal to said fastener openings being distant to each other and accommodate a heat shield.

21. The heat shield of claim 12, wherein said metallic disks are connected to each other by form-locking or adhesion.

22. The heat shield of claim 12, wherein said metallic disks are connected to each other by point welding or laser welding.

23. The heat shield of claim 12, wherein said metallic disks in the area of their connection to one another have a total thickness that is smaller than the thickness of the extended sheet in an edge area around the fastener opening.

24. The heat shield of claim 12, wherein said metallic disks each have a thickness of approximately 0.15 to 0.3 mm.

25. The heat shield of claim 12, further comprising at least one non-metallic layer comprising a high-temperature resisting fibre material, compressed mica particles and/or compressed vermiculite particles.

26. A heat shield for thermal and acoustical insulation of an object, comprising:
   at least one metallic sheet with a first and a second surface;
   at least two disk apertures passing through said at least one metallic sheet;
   a metallic disk at least partially located in at least one of said two disk apertures, said metallic disk having a fastener opening that is smaller than said disk apertures, said metallic disk being smaller than said metallic sheet, wherein said disk comprises:
   a first land with parallel upper and lower surfaces, said first land defining an inner perimeter for said fastener aperture;
   at least one inclined portion located radially outboard and unitary with said first land;
   a second land radially outboard and unitary with said inclined portion, said second land having parallel upper and lower surfaces; and
   a plurality of circumferentially spaced apart petals formed from at least said inclined portion and said second land wherein gaps are located between each petal;
   wherein at least a portion of a free end of least one of the petals rest on said first surface of said metallic sheet and at least a portion of a free end of at least one of the petals rest on said second surface of said metallic sheet.

27. An insulating isolator, comprising:
   a first land with parallel upper and a lower surfaces, said first land defining an inner perimeter for a fastener aperture;
   at least one inclined portion located radially outboard and unitary with said first land;
   a second land radially outboard and unitary with said inclined portion, said second land having parallel upper and lower surfaces; and
   a set of circumferentially spaced apart apertures formed in at least said inclined portion and said second land, wherein each of said apertures begins at the same radial distance from a fastener aperture and terminates at the same radial distance from said fastener aperture.

* * * * *